(12) United States Patent
Lesher et al.

(10) Patent No.: US 10,657,823 B2
(45) Date of Patent: May 19, 2020

(54) SYSTEM AND METHOD FOR DETERMINING WHEN AN OBJECT DETECTED BY A COLLISION AVOIDANCE SENSOR ON ONE MEMBER OF AN ARTICULATED VEHICLE COMPRISES ANOTHER MEMBER OF THE VEHICLE

(71) Applicant: Bendix Commercial Vehicle Systems LLC, Elyria, OH (US)

(72) Inventors: Michael K. Lesher, North Ridgeville, OH (US); Martin P. Franz, Portage, MI (US); Liju V. Alex, Medina, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 238 days.

(21) Appl. No.: 15/794,412

(22) Filed: Oct. 26, 2017

(65) Prior Publication Data
US 2019/0130759 A1 May 2, 2019

(51) Int. Cl.
*G06F 17/00* (2019.01)
*G08G 1/16* (2006.01)
(Continued)

(52) U.S. Cl.
CPC ............ *G08G 1/167* (2013.01); *B60W 30/08* (2013.01); *B60W 40/10* (2013.01);
(Continued)

(58) Field of Classification Search
CPC ...... G08G 1/167; B60W 40/10; B60W 30/08; B60W 2550/10; B60W 2540/18;
(Continued)

(56) References Cited

U.S. PATENT DOCUMENTS 6,894,608 B1   5/2005   Gunderson
7,612,657 B2  11/2009   Kim
(Continued)

FOREIGN PATENT DOCUMENTS

DE        10065230 A1    7/2002
DE    102005022421 A1   10/2006
(Continued)

OTHER PUBLICATIONS

English language abstract for DE 10065230 A1.
(Continued)

*Primary Examiner* — Shardul D Patel
(74) *Attorney, Agent, or Firm* — Reising Ethington P.C.

(57) ABSTRACT

A system and method system for determining when an object detected by a collision avoidance sensor on one member of an articulated vehicle comprises another member of the vehicle are provided. The system includes a collision avoidance sensor disposed on a first member of the vehicle and configured to detect an object within a field of view of the sensor on a side of the first member of the vehicle. The system further includes a controller configured to determine an articulation angle between the first member of the vehicle and a second member of the vehicle and to determine in response to the articulation angle, whether the second member of the vehicle is the object within the field of view of the collision avoidance sensor on the first member of the vehicle.

37 Claims, 5 Drawing Sheets

(51) Int. Cl.
  *B60W 30/08* (2012.01)
  *B60W 40/10* (2012.01)
  *G01P 3/00* (2006.01)

(52) U.S. Cl.
  CPC ..... *B60W 2300/14* (2013.01); *B60W 2520/10* (2013.01); *B60W 2520/14* (2013.01); *B60W 2520/22* (2013.01); *B60W 2540/18* (2013.01); *B60W 2554/00* (2020.02); *B60Y 2300/28* (2013.01); *G01P 3/00* (2013.01)

(58) Field of Classification Search
  CPC ......... B60W 2520/22; B60W 2520/14; B60W 2520/10; B60W 2300/14; G01P 3/00; B60Y 2300/28
  USPC ........... 701/301, 36, 41, 70; 345/7; 702/158; 180/338
  See application file for complete search history.

(56) References Cited

U.S. PATENT DOCUMENTS

| | | | |
|---|---|---|---|
| 7,650,961 B2* | 1/2010 | Smith | B60K 23/04 180/338 |
| 7,786,849 B2 | 8/2010 | Buckley | |
| 7,904,222 B2 | 3/2011 | Lee et al. | |
| 9,211,889 B1 | 12/2015 | Hoetzer et al. | |
| 9,487,212 B1* | 11/2016 | Adam | B60W 30/143 |
| 2005/0068197 A1* | 3/2005 | Regan | G08G 1/16 340/932.2 |
| 2008/0177454 A1* | 7/2008 | Bond | B60T 8/1708 701/70 |
| 2008/0186204 A1 | 8/2008 | Buckley | |
| 2008/0300755 A1* | 12/2008 | Madau | B60R 1/00 701/49 |
| 2010/0253594 A1* | 10/2010 | Szczerba | G01S 13/723 345/7 |
| 2014/0071278 A1* | 3/2014 | Assaf | B60R 1/12 348/148 |
| 2015/0197282 A1* | 7/2015 | Hochrein | B62D 13/06 701/41 |
| 2015/0291179 A1* | 10/2015 | Tagesson | G01B 21/16 702/158 |
| 2016/0153778 A1* | 6/2016 | Singh | G06T 7/60 701/36 |
| 2016/0274228 A1* | 9/2016 | Cashler | G01S 7/40 |
| 2017/0297493 A1* | 10/2017 | Gillespey | B60R 1/08 |
| 2018/0261088 A1* | 9/2018 | Roy | G09F 27/005 |

FOREIGN PATENT DOCUMENTS

| | | |
|---|---|---|
| DE | 102005044486 A1 | 4/2007 |
| DE | 10 2007 011 180 A1 | 9/2008 |
| DE | 102009007990 A1 | 8/2010 |
| DE | 102012017668 A1 | 3/2014 |
| DE | 102013002642 A1 | 8/2014 |
| DE | 102015117903 A1 | 4/2017 |
| EP | 2555178 A1 | 2/2013 |
| EP | 2983006 A1 | 7/2015 |
| JP | 2010244128 A | 10/2010 |
| JP | 2012046064 A | 3/2012 |
| WO | 2004086084 A1 | 10/2004 |
| WO | 2007033705 A1 | 3/2007 |
| WO | 2014037064 A1 | 3/2014 |

OTHER PUBLICATIONS

English language abstract for DE 10 2005 022 421 A1.
English language abstract for DE 10 2005 044 485 A1.
English language abstract for DE 10 2009 007 990 A1.
English language abstract for DE 10 2012 017 668 A1.
English language abstract for DE 10 2013 002 642 A1.
English language abstract for DE 10 2015 117 903 A1.
Machine translation of DE 10 2015 117 903 A1.
English language abstract for EP 2555178 A1.
English language abstract for JP 2010244128 A.
English language abstract for JP 2012046064 A.
English language abstract for WO 2007033705 A1.
English language abstract for WO 2014037064 A1.
Bortoni-Anzures, Liborio et al., Fuzzy Controller for Automatic Steering in Heavy-Vehicle Semi Trailers, vol. XIV Ingenieria Investigacion y Technologia No. 1 (2013) pp. 1-9.
International Search Report issued in corresponding International (PCT) App. No. PCT/US2018/056970 (dated Feb. 14, 2019).
Written Opinion issued in corresponding International (PCT) App. No. PCT/US2018/056970 (dated Feb. 14, 2019).

* cited by examiner

SYSTEM AND METHOD FOR DETERMINING WHEN AN OBJECT DETECTED BY A COLLISION AVOIDANCE SENSOR ON ONE MEMBER OF AN ARTICULATED VEHICLE COMPRISES ANOTHER MEMBER OF THE VEHICLE

BACKGROUND OF THE INVENTION

Field of the Invention

This invention relates to side collision avoidance systems for vehicles. In particular, the invention relates to a system and method for determining when an object detected by a collision avoidance sensor on one member of an articulated vehicle comprises another member of the vehicle.

Background Art

Collision avoidance systems are used in vehicles to prevent collisions between the vehicle and other objects (including other vehicles, pedestrians, and stationary objects such as guardrails) and to reduce the severity of any collisions that do occur. One conventional form of collision avoidance system commonly used on vehicles today is a blind spot monitoring system. Blind spots are areas on or along the roadway that cannot be seen by the vehicle operator using conventional rear view or side view mirrors on the vehicle. Blind spot monitoring systems generate warnings to the vehicle operator when an object is located in a blind spot to discourage the operator from moving the vehicle in a direction that will cause a collision with the object. Some blind spot monitoring systems may further function as, or work with, lane keeping assist systems to take action autonomously (without action by the vehicle operator) to move or prevent movement of the vehicle to avoid a collision.

Blind spot monitoring systems employ sensors located on either side of the vehicle in order to detect objects in blind spots on either side of the vehicle. When objects are detected, the sensors generate signals along a vehicle communications bus. These signals may, for example, be used to generate an audio or visual warning to the vehicle operator that an object is located within a blind spot. In articulated vehicles such as tractor-trailers, it is possible for one member of the vehicle to enter the field of view of a sensor installed on another member of the vehicle. For example, in parking and docking areas, turning the vehicle often results in a high degree of articulation between members of the vehicle. As a result, sensors on one member of the vehicle may generate signals indicative of an object in the vehicle's blind spot when the object is actually another member of the vehicle. Warnings to the vehicle operator generated in response to such signals can distract and/or annoy the vehicle operator. In certain vehicles, the signals may also cause unwarranted and undesirable actions by autonomous control systems on the vehicles.

The inventors herein have recognized a need for a system and method for determining when an object detected by a collision avoidance sensor on one member of an articulated vehicle comprises another member of the vehicle that will minimize and/or eliminate one or more of the above-identified deficiencies.

BRIEF SUMMARY OF THE INVENTION

This invention relates to side collision avoidance systems for vehicles. In particular, the invention relates to a system and method for determining when an object detected by a collision avoidance sensor on one member of an articulated vehicle comprises another member of the vehicle.

A system for determining when an object detected by a collision avoidance sensor on one member of an articulated vehicle comprises another member of the vehicle in accordance with one embodiment includes a collision avoidance sensor disposed on a first member of the vehicle. The collision avoidance sensor is configured to detect an object within a field of view of the sensor on a side of the first member of the vehicle. The system further includes a controller configured to determine an articulation angle between the first member of the vehicle and a second member of the vehicle. The controller is further configured to determine, in response to the articulation angle, whether the second member of the vehicle is the object within the field of view of the collision avoidance sensor on the first member of the vehicle.

An article of manufacture in accordance with one embodiment includes a non-transitory computer storage medium having a computer program encoded thereon that when executed by a controller determines when an object detected by a collision avoidance sensor on one member of an articulated vehicle comprises another member of the vehicle. The computer program includes code for determining an articulation angle between the first member of the vehicle and a second member of the vehicle and determining, in response to the articulation angle, whether the second member of the vehicle is the object within the field of view of the collision avoidance sensor on the first member of the vehicle.

A method for determining when an object detected by a collision avoidance sensor on one member of an articulated vehicle comprises another member of the vehicle in accordance with one embodiment includes the step of detecting an object within a field of view of a collision avoidance sensor on a first member of the vehicle. The method further includes the step of determining an articulation angle between the first member of the vehicle and a second member of the vehicle. The method further includes the step of determining, in response to the articulation angle, whether the second member of the vehicle is the object within the field of view of the collision avoidance sensor on the first member of the vehicle.

A system and method for determining when an object detected by a collision avoidance sensor on one member of an articulated vehicle comprises another member of the vehicle in accordance the present teachings represent an improvement as compared to conventional systems and methods. In particular, the system and method enable suppression of unfounded warnings to the vehicle operator resulting from significant articulation of the vehicle and prevent unwarranted reactions in autonomous control systems on the vehicle.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
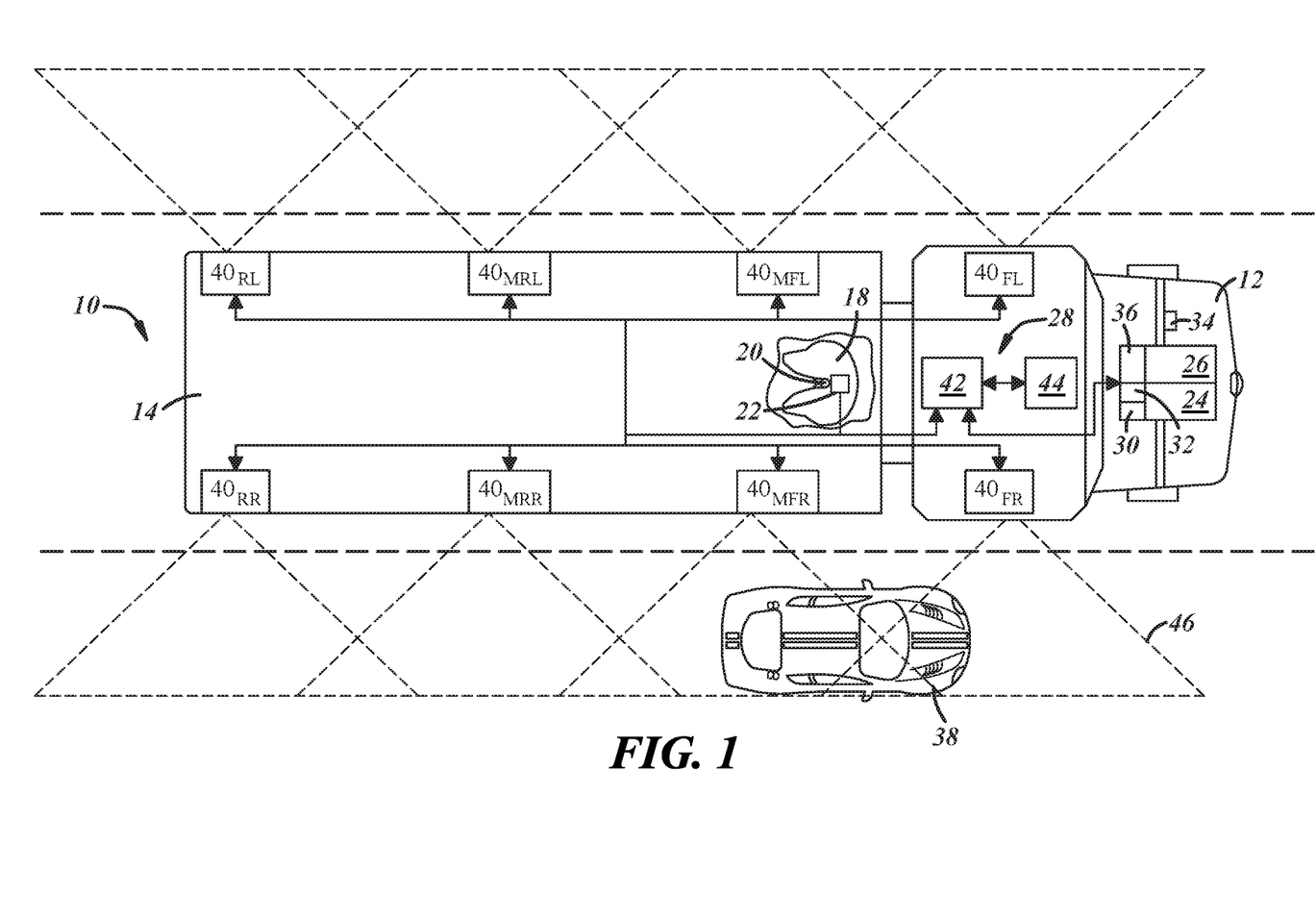
FIGS. 1-2 are diagrammatic views of a vehicle including a system for determining when an object detected by a collision avoidance sensor on one member of an articulated vehicle comprises another member of the vehicle in accordance with one embodiment of the present teachings.
Figure 2:
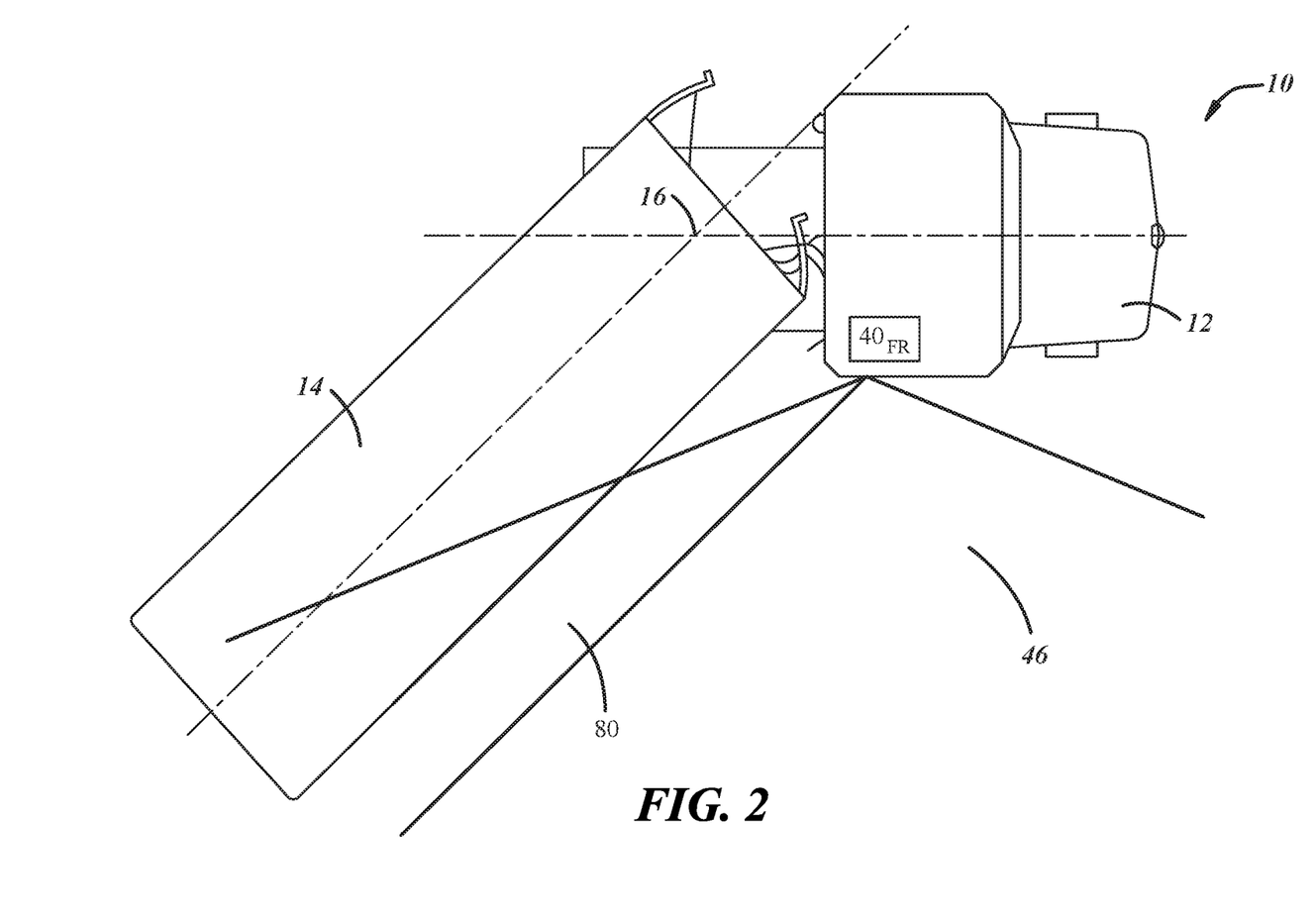

Referring now to the drawings wherein like reference numerals are used to identify identical components in the various views, FIGS. 1-2 illustrate an articulated vehicle 10. Articulated vehicles are vehicles having multiple members or sections that are coupled to one another at hinge joints that allow the members to pivot relative to each other as shown in FIG. 2. In the illustrated embodiment, vehicle 10 comprises a tractor-trailer (also referred to as a semi) having two members—a truck or tractor 12 and a trailer 14—that are configured to pivot relative to one another about a vertical axis 16 at a hinge joint. Referring to FIG. 1, the joint may be formed, for example, by a fifth wheel 18 on tractor 12 and a kingpin 20 extending downward from trailer 14 into the fifth wheel 18. In accordance with certain embodiments discussed below, an articulation angle sensor 22 may generate an articulation signal indicative of the articulation angle between the tractor 12 and trailer 14 responsive to rotation of kingpin 20 (e.g., by tracking movement of one or more magnets attached to kingpin 20). Tractor 12 contains a power unit, such as an internal combustion engine, and steering and drive axles. Trailer 14 is supported on one or more trailer axles, is provided to store freight and is detachably coupled to tractor 12. It should be understood that, although vehicle 10 includes only two members 12, 14, vehicle 10 may include more than two members with hinge joints disposed between each pair of adjacent members in the vehicle (e.g., a tractor-trailer having multiple trailers). It should also be understood that vehicle 10 may comprise other types of articulated vehicles such as multi-section buses, hook and ladder firetrucks, passenger vehicles towing a trailer or other load, etc. In accordance with certain embodiments, vehicle 10 may include an electric power steering system 24 and an electronic stability control system 26. Vehicle 10 further includes a collision avoidance system in the form or a side object detection system or blind spot monitoring system 28.

Electric power steering system 24 provides assistance to the vehicle operator to turn the vehicle wheels and steer vehicle 10. System 24 may also provide the ability for autonomous steering of vehicle 10 without input from the vehicle operator. System 24 may include a conventional electric motor that moves a steering rack connected to wheels on opposite side of the vehicle in response to rotation of the steering wheel by the vehicle operator. Steering angle sensors 30, 32 on the steering column output signals to a controller for the electric motor that are indicative of a steering angle imparted by a vehicle operator to a steering wheel. A wheel speed sensor 32 may output a signal to the controller indicative of the speed of vehicle 10. The controller may also receive inputs from various collision avoidance systems including lane keeping assist or lane centering assist systems that employ cameras or other sensors to detect lane lines and attempt to maintain vehicle 10 between the lane lines in the absence of a demonstrated intent by the vehicle operator to cross a line (e.g. use of a turn signal). In accordance with the present teachings, the controller for the motor may also receive inputs from system 28 which may, in some embodiments, generate control signals intended to prevent collision of the vehicle with an object in a blind spot of the vehicle 10.

Electronic stability control system 26 is provided to maintain the stability and steering control of vehicle 10 by detecting a loss of traction between the vehicle wheels and the road and controlling torque imparted to the wheels to regain traction and steering control. A controller in system 26 continuously compares the intended direction of vehicle 10 as determined by signals from steering angle sensor 30 with the actual direction of vehicle 10 as determined through a yaw rate sensor 36 that measures the angular velocity of vehicle 10 about its vertical (yaw) axis. When the intended and actual directions of vehicle 10 diverge, the controller generates control signals for one or both of the vehicle engine and the wheel brakes in order to control the torque at one or more of the wheels on vehicle 10 so that the actual direction of vehicle 10 will match the intended direction. In accordance with the present teachings, the controller for system 26 may again receive inputs from system 28 which may, in some embodiments, generate control signals intended to prevent collision of the vehicle with an object in a blind spot of the vehicle 10.

System 28 is provided to identify objects 38 on either side of vehicle 10 and, in particular, in blind spots of vehicle 10. Blind spots generally comprise areas surrounding the vehicle that cannot be seen by the vehicle operator using the rear view and side view mirrors on the vehicle. It should be understood, however, that system 28 may be capable of identifying objects that are in areas on either side of vehicle 10 that do not comprise blind spots. Objects 38 identified by system 20 may comprise objects that are in motion such as other vehicles or pedestrians. Objects 38 may also comprise objects that are stationary including guard rails, signs and other road infrastructure. System 28 may include one or more sensors 40, a controller 42 and an operator interface 44 that communicate with one another over a conventional vehicle communications bus and, in particular, a controller area network (CAN). In accordance with the present teachings, portions of system 28 are configured to determine when an object detected by a sensor 40 on one member 12, 14 of vehicle 10 comprises another member 12, 14 of vehicle 10.

Sensors 40 having a defined field of view 46 are provided to identify objects 38. Sensors 40 may comprise radar (radio detection and ranging) sensors, but may also comprise lidar (light detection and ranging) and ultrasonic sensors. In the illustrated embodiment, vehicle 10 includes eight sensors 40 with four sensors located on each side of vehicle 10 in standard locations in accordance with SAE standard J1939 (front left, mid front left, mid rear left, rear left, front right, mid front right, mid front right and rear right). It should be understood, however, that the number of sensors 40 may vary. Further, in some vehicles, sensors 40 may be located on only one side of the vehicle (e.g., the passenger side). Each sensor 40 is configured to generate electromagnetic waves within a corresponding field of view 46 on one side of vehicle 10. The waves will reflect off of any objects 38 in the field of view 46. Each sensor 40 is further configured to receive reflections of the electromagnetic waves from any objects 38 in the field of view 46 as a result of relative motion between vehicle 10 and objects 38. In the case of radar sensors, waves may be transmitted and received by sensor 40 using conventional antennae. Each sensor 40 is further configured to generate a signal responsive to the reflection of an electromagnetic wave by an object 38. Sensor 40 converts the reflected wave into a digital signal for further use within system 28. Referring to FIG. 2, in articulated vehicles, pivotal movement of one member 12, 14 of vehicle 10 about axis 16 relative to another member 12, 14 of vehicle 10 may result in a member 12, 14 of vehicle 10 entering the field of view 46 of a sensor 40 on another member 12, 14 of vehicle 10. This type of relative motion frequently occurs during parking of vehicle 10, maneuvering vehicle 10 for loading and unloading of freight, and maneuvering around tight corners. In these situations, warnings generated in response to the presence of a member 12, 14 of vehicle 10 in the field of view 46 of a sensor 40 may create an undesirable distraction and/or annoyance for the vehicle operator and, in certain vehicles, may even cause unwarranted and undesirable actions by autonomous control systems on the vehicles.

Referring again to FIG. 1, controller 42 determines whether objects 38 on either side of vehicle 10 detected by sensors 40 justify a warning to the vehicle operator or some other action including autonomous control of systems 24, 26. Controller 42 may comprise a programmable microprocessor or microcontroller or may comprise an application specific integrated circuit (ASIC). Controller 42 may include a central processing unit (CPU). Controller 42 may also include an input/output (I/O) interface through which controller 42 may receive a plurality of input signals and transmit a plurality of output signals. The input signals may include signals from sensors 40 indicative of the presence of objects 38 on a side of vehicle 10. The output signals may include signals used to control operator interface 44 or systems 24, 26. In the illustrated embodiment, a single controller 42 is shown that receives signals generated by each of sensors 40. It should be understood, however, that separate controllers could be configured to receive signals from one or more sensors and to communicate with one another. For example, separate controllers could receive signals generated by each sensor 40 or separate controllers could receive signals from all sensors 40 on a corresponding side of vehicle 10. It should also be understood that controller 42 could form a part of sensors 40, interface 44, steering system 24, stability control system 26 or another component or system of vehicle 10 or may form a freestanding unit. Finally, it should also be understood that the functionality of controller 42 described herein may be divided among multiple sub-controllers forming parts of sensors 40, interface 44, steering system 24, stability control system 26 or another component or system of vehicle 10 such that the actions hereinafter described are subdivided among various vehicle components and systems.

Figure 3A:
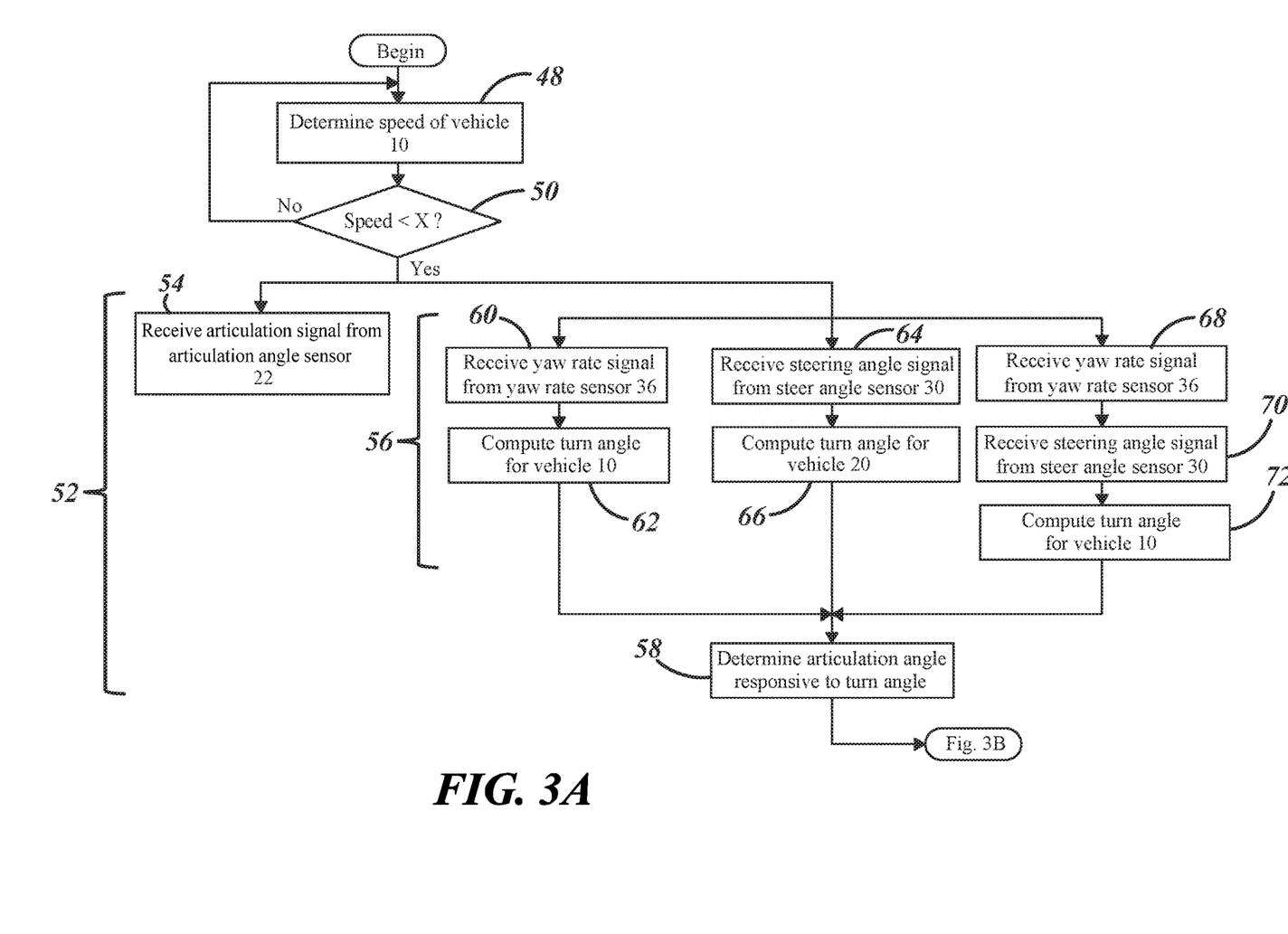
FIGS. 3A-B are flow chart diagrams illustrating a method for determining when an object detected by a collision avoidance sensor on one member of an articulated vehicle comprises another member of the vehicle in accordance with one embodiment of the present teachings.
Figure 3B:
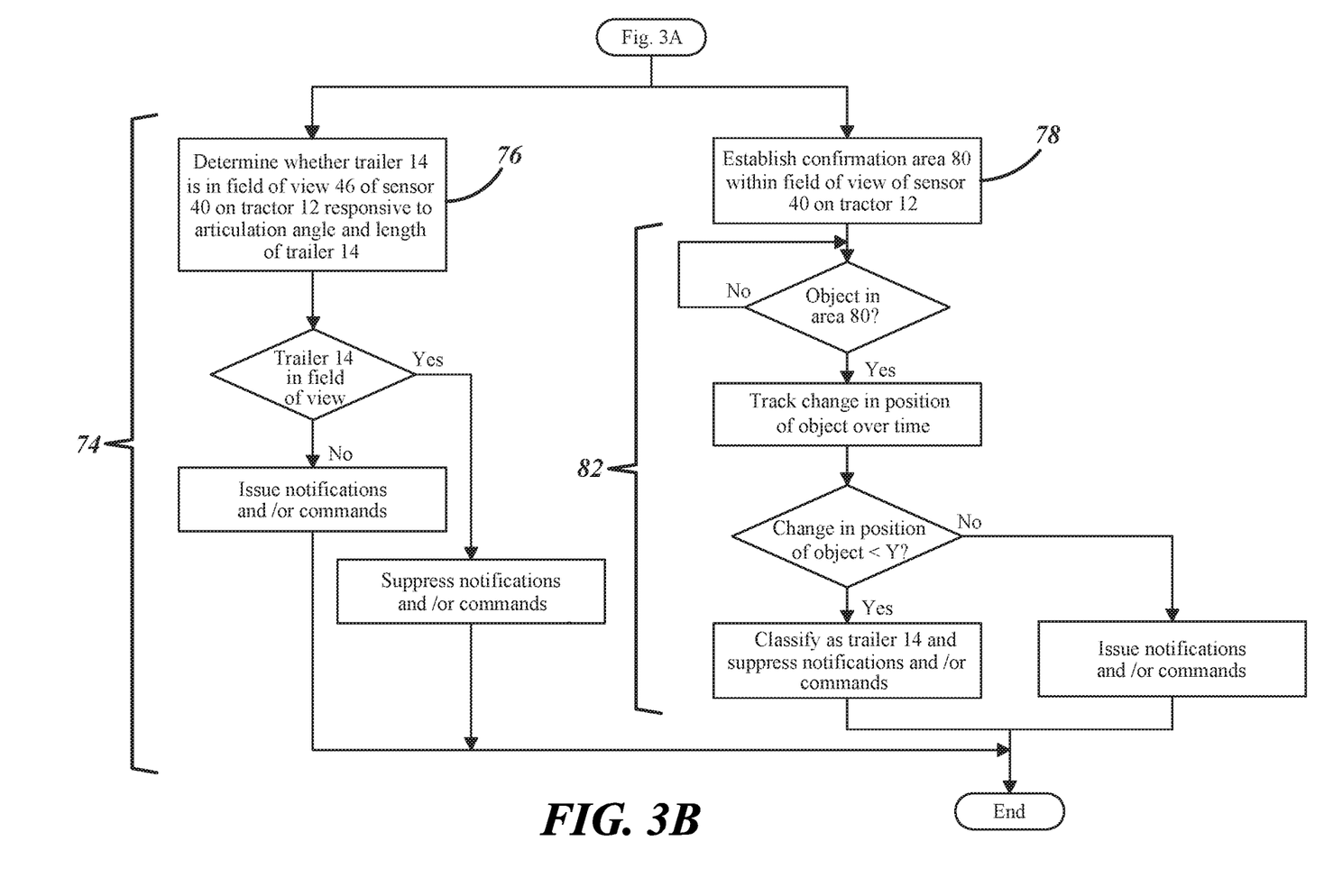

In accordance with the present teachings, controller 42 may be configured with appropriate programming instructions (i.e., software or a computer program) to implement a method for determining when an object detected by a sensor 40 on one member 12, 14 of vehicle 10 comprises another member 12, 14 of vehicle 10 as described hereinbelow. Some or all of the programming instructions may be encoded on a non-transitory computer storage medium and executed by the controller 42. It should again be understood that, although the illustrated embodiment of vehicle 10 includes only two members 12, 14, the disclosed method can also be used in articulated vehicles having three or more members and that the method can be used to determine whether an object within the field of view of a sensor on any member of the articulated vehicle comprises any other member of the articulated vehicle (e.g., the method may be used to determine whether an object in the field of view of a sensor on a tractor in a three member vehicle comprising a tractor and two trailers comprises either of the trailers). Referring now to FIGS. 3A-3B, embodiments of a method for determining when an object detected by a sensor 40 on one member 12, 14 of vehicle 10 comprises another member 12, 14 of vehicle 10 may begin with the steps 48, 50 of determining the speed of vehicle 10 and determining whether the speed meets a predetermined condition relative to a predetermined speed (e.g., is below the predetermined speed). At relatively high speeds, there is unlikely to be substantial articulation between the members 12, 14 of an articulated vehicle 10. Rather, significant articulation typically only occurs at relatively low speeds during, for example, maneuvering of the vehicle 10 for loading, unloading or parking. Therefore, in accordance with some embodiments, the method may simply continue to monitor the speed of vehicle 10 if the speed of vehicle 10 fails to meet the predetermined condition relative to the predetermined speed (e.g., because the speed of vehicle 10 is equal to or exceeds the predetermined speed) on the assumption that any object within the field of view 46 of a sensor on a member 12 or 14 of vehicle 10 is unlikely to comprise the other member 12, 14 of vehicle 10.

If the speed of vehicle 10 does meet the predetermined condition (e.g., is less than the predetermined speed), the method may continue with subsequent steps to determine if an object within the field of view of a given sensor 40 comprises a member 12, 14 of vehicle 10. In particular, the method may continue with the step 52 of determining an articulation angle between two members of vehicle 10 such as tractor 12 and trailer 14. The articulation angle may be determined in several different ways. In one embodiment, step 52 may include the substep 54 of receiving an articulation signal indicative of the articulation angle from articulation angle sensor 22. As noted above, sensor 22 may generate a signal indicative of the articulation of members 12, 14 responsive to rotation of kingpin 20. Sensor 22 may transmit the articulation signal to controller 42 using a vehicle communications bus such as a controller area network (CAN).

In vehicles lacking an articulation sensor 22 or other direct determination of articulation between members 22, 24, step 52 may include several substeps to indirectly determine the articulation angle between members 12, 14. In one embodiment, step 52 may include substeps 56, 58 of determining a turn angle of one of members 12, 14 such as tractor 12 and determining the articulation angle responsive to the turn angle.

In one embodiment, substep 56 may include the substeps 60, 62 of receiving a yaw rate signal from yaw rate sensor 36 indicative of the speed of member 12 about a yaw axis and computing the turn angle responsive to the speed about the yaw axis. Substep 60 may itself involve several substeps to filter and integrate the yaw rate (in radians/second) indicated by the yaw rate signal. First, an offset recorded when vehicle 10 is not in motion may be subtracted from the yaw rate indicated by the yaw rate signal to calibrate the signal. Second, an average of the two most recent yaw rates indicated by the yaw rate signal may be obtained. Finally, the average may be integrated using the time over which a turn of vehicle 10 occurs. Controller 42 may initiate a timer when the yaw rate exceeds a predetermined yaw rate indicative of an offset and noise and terminate the timer when the yaw rate falls below either the predetermined yaw rate or another predetermined yaw rate indicative of the end of a turn.

In another embodiment, substep 56 may include the substeps 64, 66 of receiving a steering angle signal from steering angle sensor 30 indicative of a steering angle of vehicle 10 and computing the turn angle responsive the steering angle. Substep 66 may involve use of a known relationship between the steering angle and turn angle. This relationship may be stored in a data structure in a memory that is within controller 42 or otherwise accessible by controller 42. For example, the memory may include a look up table that correlates the steering angle and turn angle.

In yet another embodiment, substep 56 may include the substeps 68, 70, 72 of receiving both the yaw rate signal from yaw rate sensor 36 and the steering angle signal from steering angle sensor 30 and computing the turn angle responsive to both the yaw rate and the steering angle. Use of the steering angle or the yaw rate may provide more accurate results depending on the speed of vehicle 10. For example, at relatively low speeds the steering angle may be a more precise indicator of turn angle. In some embodiments, the steering angle and yaw rate (after filtering and integration) may be averaged before the turn angle is computed in step 72. In another embodiment, a weight may be applied to both the steering angle and the yaw rate (after filtering and integration) dependent on the speed of vehicle 10 determined in step 48. For example, if the speed is relatively low, more weight may be given to the steering angle than the yaw rate. As the value of the speed increases, the weight applied to the steering angle may be reduced while the weight applied to the yaw rate may be increased. The relative weights applied to the steering angle and yaw rate may be determined in accordance with a formula responsive to the speed or the weights may be stored in a data structure such as look up table that is accessed based on the speed.

In yet another embodiment, substep 56 may include receiving wheel speeds for the wheels on either side of the front axle of vehicle 10 to compute a wheel speed differential and then computing the turn angle from the wheel speed differential. The wheel speeds may be obtained from conventional wheel speed sensors. Controller 42 may either compute a differential in wheel speeds or may receive the computed differential from another system. Controller 42 may use the wheel speed differential to determine the turning radius of vehicle 10 and, therefore, the turn angle.

Figure 4:
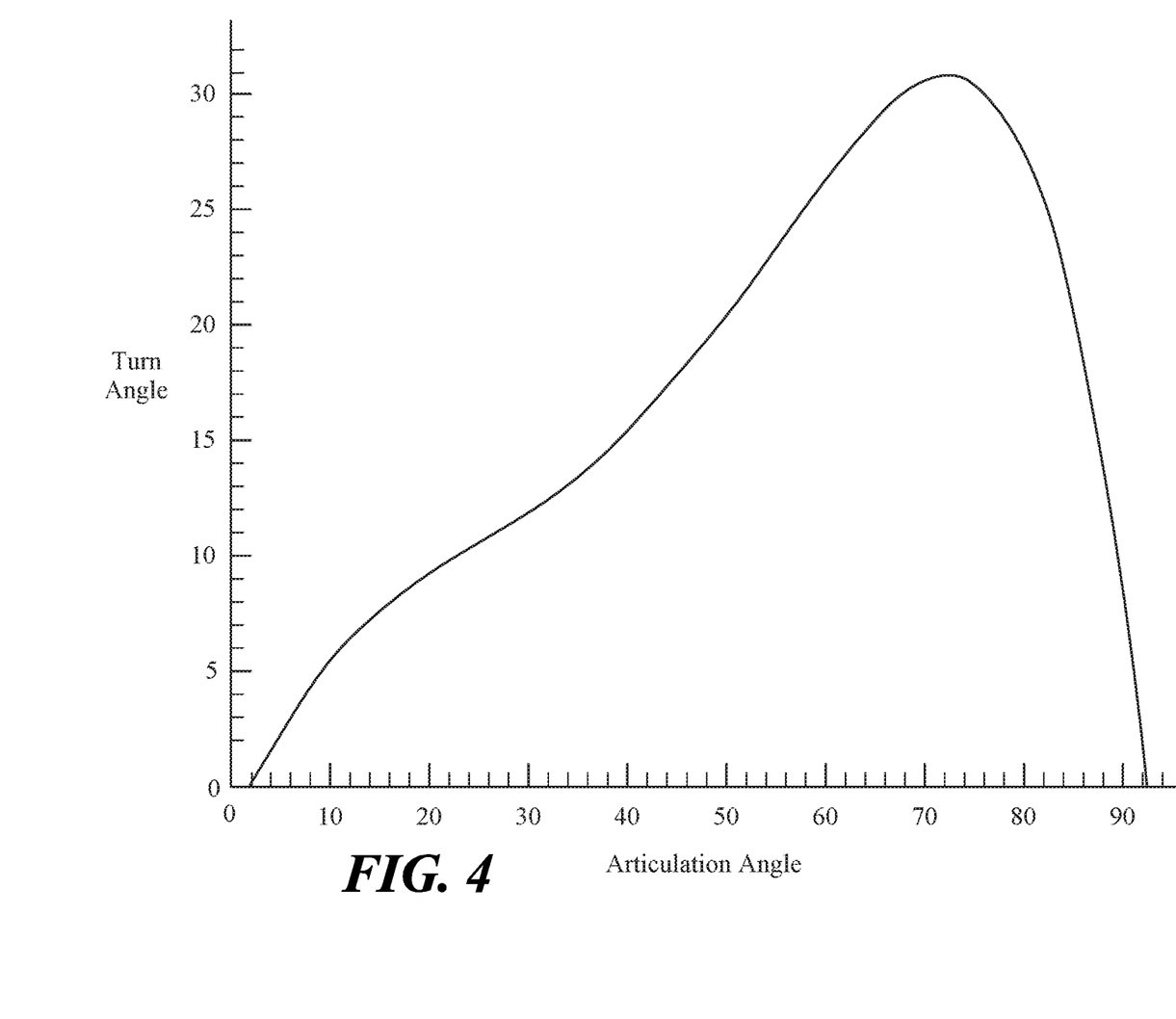
FIG. 4 is a graph illustrating a relationship between a turn angle of a member of an articulated vehicle and an articulation angle between that member and another member of the vehicle.

Substep 58 may be performed using a known relationship between the turn angle of member 12 of vehicle 10 and the resulting articulation angle between members 12, 14. Referring to FIG. 4, a graph illustrating the relationship between the turn angle of member 12 and the articulation angle between members 12, 14 is shown. This relationship may be stored in a data structure in a memory that is within controller 42 or otherwise accessible by controller 42. For example, the memory may include a look up table that correlates the turn angle and articulation angle.

Referring now to FIG. 3B, the method may continue with the step 74 of determining, in response to the articulation angle, whether trailer 14 is the object within the field of view of sensor 40 on tractor 12. In one embodiment, step 74 may include the substep 76 of determining whether trailer 14 is the object within the field of view of sensor 40 on tractor 12 in response to the articulation angle and the length of trailer 14. The length of trailer 14 may be stored in a memory within, or accessible by, controller 42. The length may be pre-programmed (in the case of a tractor 12 carrying a consistent load) or may be input through operator interface 44 or another interface. Knowing the articulation angle of tractor 12 and trailer 14 and the length of trailer 14, controller 42 is capable of determining whether a portion of trailer 14 will be disposed within the field of view 46 of the sensor 40. If this determination indicates that trailer 14 is not within the field of view 46 of sensor 40, controller 42 may treat the detected object like normal and issue appropriate notifications to the operator and/or commands to autonomous vehicle systems. If the determination indicates that trailer 14 is within the field of view of sensor 40, controller 42 may suppress notifications to the vehicle operator and/or commands to autonomous vehicle systems.

In another embodiment, step 74 may include the substep 78 of establishing, responsive to the articulation angle, a confirmation area 80 within the field of view 46 of sensor 40. Referring to FIG. 2, as the articulation between tractor 12 and trailer 14 increases, trailer 14 will begin to enter one side of the field of view 46 of sensor 40 on tractor 12. In one embodiment, the confirmation area 80 may be defined as the angular span of the field of view 46 minus the difference of one hundred and eighty (180) degrees and the articulation angle. For example, if the field of view 46 of sensor 40 spans one hundred and fifty (150) degrees and the articulation angle determined in step 52 is forty-five (45) degrees, then the confirmation area will be fifteen (15) degrees (150–(180–45)). Within this area or portion of field of view 46, an object identified by the sensor 40 could potentially comprise trailer 14. In some embodiments, controller 42 may simply suppress any notifications to the vehicle operator based on objects detected by sensor 40 in the confirmation area 80 and/or control signals that would normally be issued to autonomous driving systems. Referring again to FIG. 3B, in other embodiments, step 74 may further include the substep 82 of monitoring the object detected by sensor 40 within confirmation area 80 in order to classify the object 40 as trailer 14 or another object. In one embodiment, controller 42 may monitor the position of the object in field of view 46 over time to determine whether the position of the object within the field of view 46 changes. If a difference in position of the object in the field of view 46 over a period of time meets a predetermined condition (e.g., the change in position exceeds a predetermined amount thereby indicating relative movement between vehicle 10 and the object), controller 42 may treat the object like normal and issue appropriate notifications to the operator and/or commands to autonomous vehicle systems. If the difference in position fails to meet the predetermined condition (e.g., the change in position is less than a predetermined amount thereby indicating a lack of relative motion between vehicle 10 and the object), controller 42 may classify the object as a member of vehicle 10 and suppress notifications to the vehicle operator and/or commands to autonomous vehicle systems.

Referring again to FIG. 1, operator interface 44 is provides a means for warning the vehicle operator that an object is located in a blind spot. Interface 44 may include light emitters, such as light emitting diodes, or sound emitters, such as a speaker, to convey visual and/or audio warnings. In the case of visual warnings, information about the location of the object (e.g., left or right side of the vehicle and fore-aft location of the object relative to the vehicle) or other characteristics of the object (e.g., speed) can be conveyed through differences in color, differences in intensity, differences in the number of lights, and differences in the pattern of activation of the lights. In the case of audio warnings, similar information can be conveyed through differences in the type of sound generated, differences in volume and differences in the pattern of sounds.

A system and method for determining when an object detected by a collision avoidance sensor 40 on one member 12, 14 of an articulated vehicle 10 comprises another member 12, 14 of the vehicle 10 in accordance the present teachings represent an improvement as compared to conventional systems and methods. In particular, the system and method enable suppression of unfounded warnings to the vehicle operator resulting from significant articulation of the vehicle 10 and prevent unwarranted reactions in autonomous control systems on the vehicle 10.

While the invention has been shown and described with reference to one or more particular embodiments thereof, it will be understood by those of skill in the art that various changes and modifications can be made without departing from the spirit and scope of the invention.

What is claimed is:

1. A system for determining when an object detected by a collision avoidance sensor on one member of an articulated vehicle comprises another member of the vehicle, comprising:
    a collision avoidance sensor disposed on a first member of an articulated vehicle in which the first member is configured to pivot relative to a second member of the articulated vehicle about a pivot axis, the collision avoidance sensor configured to detect an object within a field of view of the sensor on a side of the first member of the articulated vehicle; and
    a controller configured to
        determine an articulation angle between the first member of the articulated vehicle and the second member of the articulated vehicle about the pivot axis; and
        determine, in response to the articulation angle, whether the second member of the articulated vehicle is the object within the field of view of the collision avoidance sensor on the first member of the articulated vehicle.

2. The system of claim 1, further comprising an articulation angle sensor disposed on the articulated vehicle, the articulation angle sensor generating an articulation signal indicative of the articulation angle.

3. The system of claim 2 wherein the articulation angle sensor generates the articulation signal responsive to rotation of a kingpin on one of the first and second members of the articulated vehicle.

4. The system of claim 1 wherein the controller is further configured, in determining the articulation angle, to:
    determine a turn angle of one of the first and second members of the articulated vehicle; and
    determine the articulation angle responsive to the turn angle.

5. The system of claim 4 wherein the controller is further configured, in determining the turn angle, to:
    receive a steering angle signal from a steering angle sensor indicative of a steering angle of the one member; and
    compute the turn angle responsive to the steering angle.

6. The system of claim 4 wherein the controller is further configured, in determining the turn angle, to:
    receive a yaw rate signal from a yaw rate sensor indicative of a speed about a yaw axis of the one member; and
    compute the turn angle responsive to the speed about the yaw axis.

7. The system of claim 4 wherein the controller is further configured, in determining the turn angle, to:
    receive a steering angle signal from a steering angle sensor indicative of a steering angle of the one member; and
    receive a yaw rate signal from a yaw rate sensor indicative of a speed about a yaw axis of the one member; and
    compute the turn angle responsive to the steering angle and the speed about the yaw axis.

8. The system of claim 7 wherein the controller is further configured, in computing the turn angle, to weight the steering angle and the speed about the yaw axis in response to a speed of the articulated vehicle.

9. The system of claim 1 wherein the controller determines the articulation angle only when a speed of the articulated vehicle meets a predetermined condition relative to a predetermined speed.

10. The system of claim 1 wherein the controller determines whether the second member of the articulated vehicle is the object within the field of view of the collision avoidance sensor on the first member of the articulated vehicle responsive to the articulation angle and a length of the articulated vehicle.

11. The system of claim 1 wherein the controller is further configured, in determining whether the second member of the articulated vehicle is the object within the field of view of the collision avoidance sensor on the first member of the articulated vehicle, to:
    establish, responsive to the articulation angle, a confirmation area within the field of view of the collision avoidance sensor; and
    monitor the object when the object is within the confirmation area.

12. The system of claim 11 wherein the controller is further configured, in monitoring the object, to determine whether a difference in position of the object within the field of view over a period of time meets a predetermined condition.

13. The system of claim 1 wherein the controller is further configured to transmit information regarding the object to an operator interface of the articulated vehicle when the second member of the articulated vehicle is not the object within the field of view of the collision avoidance sensor on the first member of the articulated vehicle.

14. An article of manufacture, comprising: a non-transitory computer storage medium having a computer program encoded thereon that when executed by a controller determines when an object detected by a collision avoidance sensor on a first member of an articulated vehicle comprises a second member of the articulated vehicle, the first member of the articulated vehicle configured to pivot relative to the second member of the articulated vehicle about a pivot axis, the computer program including code comprising computer instructions configured to cause one or more computer processors to perform the steps of: determining an articulation angle between the first member of the articulated vehicle and the second member of the articulated vehicle about the pivot axis; and, determining, in response to the articulation angle, whether the second member of the articulated vehicle is the object within the field of view of the collision avoidance sensor on the first member of the articulated vehicle.

15. The article of manufacture of claim 14 wherein the step of determining the articulation angle includes: determining a turn angle of one of the first and second members of the articulated vehicle; and determining the articulation angle responsive to the turn angle.

16. The article of manufacture of claim 15 wherein determining the turn angle includes computing the turn angle responsive a steering angle of the one member.

17. The article of manufacture of claim 15 wherein determining the turn angle includes computing the turn angle responsive to a speed of the one member about a yaw axis of the one member.

18. The article of manufacture of claim 15 wherein determining the turn angle includes computing the turn angle responsive a steering angle of the one member and a speed of the one member about a yaw axis of the one member.

19. The article of manufacture of claim 18 wherein computing the turn angle weights the steering angle and the speed about the yaw axis in response to a speed of the articulated vehicle.

20. The article of manufacture of claim 14 wherein step of determining the articulation angle executes only when a speed of the articulated vehicle meets a predetermined condition relative to a predetermined speed.

21. The article of manufacture of claim 14 wherein the computer instructions are configured to cause the one or more computer processors to perform the step of determining whether the second member of the articulated vehicle is the object within the field of view of the collision avoidance sensor on the first member of the articulated vehicle responsive to the articulation angle and a length of the articulated vehicle.

22. The article of manufacture of claim 14 wherein the step of determining whether the second member of the articulated vehicle is the object within the field of view of the collision avoidance sensor on the first member of the articulated vehicle, includes: establishing, responsive to the articulation angle, a confirmation area within the field of view of the collision avoidance sensor; and, monitoring the object when the object is within the confirmation area.

23. The article of manufacture of claim 22 wherein monitoring the object includes determining whether a difference in position of the object within the field of view over a period of time meets a predetermined condition.

24. The article of manufacture of claim 14 wherein the computer instructions are configured to cause the one or more computer processors to perform the step of transmitting information regarding the object to an operator interface of the articulated vehicle when the second member of the articulated vehicle is not the object within the field of view of the collision avoidance sensor on the first member of the articulated vehicle.

25. A method for determining when an object detected by a collision avoidance sensor on one member of an articulated vehicle comprises another member of the vehicle, comprising the steps of:
    detecting an object within a field of view of a collision avoidance sensor on a first member of an articulated vehicle in which the first member is configured to pivot relative to a second member of the articulated vehicle about a pivot axis;
    determining an articulation angle between the first member of the articulated vehicle and the second member of the articulated vehicle about the pivot axis; and,
    determining, in response to the articulation angle, whether the second member of the articulated vehicle is the object within the field of view of the collision avoidance sensor on the first member of the articulated vehicle.

26. The method of claim 25 wherein the step of determining an articulation angle includes the substep of receiving an articulation signal indicative of the articulation angle from an articulation angle sensor disposed on the articulated vehicle.

27. The method of claim 26 wherein the articulation angle sensor generates the articulation signal responsive to rotation of a kingpin on one of the first and second members of the articulated vehicle.

28. The method of claim 25 wherein the step of determining the articulation angle includes the substeps of:
    determining a turn angle of one of the first and second members of the articulated vehicle; and
    determining the articulation angle responsive to the turn angle.

29. The method of claim 28 wherein the substep of determining the turn angle includes the substeps of:
    receiving a steering angle signal from a steering angle sensor indicative of a steering angle of the one member; and
    computing the turn angle responsive to the steering angle.

30. The method of claim 28 wherein the substep of determining the turn angle includes the substeps of:
    receiving a yaw rate signal from a yaw rate sensor indicative of a speed about a yaw axis of the one member; and
    computing the turn angle responsive to the speed about the yaw axis.

31. The method of claim 28 wherein the substep of determining the turn angle includes the substeps of:
    receiving a steering angle signal from a steering angle sensor indicative of a steering angle of the one member;
    receiving a yaw rate signal from a yaw rate sensor indicative of a speed about a yaw axis of the one member; and
    computing the turn angle responsive to the steering angle and the speed about the yaw axis.

32. The method of claim 31 wherein the step of computing the turn angle includes weighting the steering angle and the speed about the yaw axis in response to a speed of the articulated vehicle.

33. The method of claim 25 wherein the step of determining the articulation angle is performed only when a speed of the articulated vehicle meets a predetermined condition relative to a predetermined speed.

34. The method of claim 25 wherein the step of determining whether the second member of the articulated vehicle is the object within the field of view of the collision avoidance sensor on the first member of the articulated vehicle includes determining whether the second member of the articulated vehicle is the object within the field of view of the collision avoidance sensor on the first member of the articulated vehicle responsive to the articulation angle and a length of the articulated vehicle.

35. The method of claim 25 wherein the step of determining whether the second member of the articulated vehicle is the object within the field of view of the collision avoidance sensor on the first member of the articulated vehicle includes the substeps of:
    establishing, responsive to the articulation angle, a confirmation area within the field of view of the collision avoidance sensor; and
    monitoring the object when the object is within the confirmation area.

36. The method of claim 35 wherein the substep of monitoring the object within the confirmation area includes the substep of determining whether a difference in position of the object within the field of view over a period of time meets a predetermined condition.

37. The method of claim 25, further comprising the step of transmitting information regarding the object to an operator interface of the articulated vehicle when the second member of the articulated vehicle is not the object within the field of view of the collision avoidance sensor on the first member of the articulated vehicle.

* * * * *